(12) United States Patent
Côté

(10) Patent No.: US 6,253,707 B1
(45) Date of Patent: Jul. 3, 2001

(54) BIRD FEEDER

(76) Inventor: Paul L. Côté, 18 Valleyview, Box 64, Knowlton, Quebec (CA), J0E 1V0

( * ) Notice: Subject to any disclaimer, the term of this patent is extended or adjusted under 35 U.S.C. 154(b) by 0 days.

(21) Appl. No.: 09/499,835

(22) Filed: Feb. 8, 2000

Related U.S. Application Data (60) Provisional application No. 60/119,444, filed on Feb. 10, 1999, and provisional application No. 60/150,940, filed on Aug. 16, 1999.

(51) Int. Cl.$^7$ .................................................... A01K 39/01
(52) U.S. Cl. ............................................................. 119/57.9
(58) Field of Search .................................. 119/52.2, 52.3, 119/52.4, 57.8, 57.9, 51.01

(56) References Cited

U.S. PATENT DOCUMENTS

| | | | |
|---|---|---|---|
| 4,318,364 | * | 3/1982 | Bescherer . |
| 4,541,362 | * | 9/1985 | Dehls ................................ 119/57.9 |
| 4,646,686 | * | 3/1987 | Furlani ............................... 119/57.9 |
| 5,163,382 | * | 11/1992 | Morrison ............................ 119/57.9 |
| 5,375,558 | * | 12/1994 | Drakos ............................... 119/57.9 |
| 5,445,109 | * | 8/1995 | Gray et al. ......................... 119/57.9 |
| 5,720,238 | * | 2/1998 | Drakos ............................... 119/57.9 |

* cited by examiner

*Primary Examiner*—Thomas Price
(74) *Attorney, Agent, or Firm*—Eric Fincham

(57) ABSTRACT

A bird feeder having a base and an outer wall extending upwardly therefrom with an access opening is said wall, a shroud extending about the feed container, the shroud also having a shroud access opening which is normally substantially in alignment with the feed container access opening to thereby permit access to the feed container by birds, a hanger connected to the feed container, an extendable means within the feed container interconnecting the shroud and feed container such that when a pre-determined weight is placed on the shroud, the extendable means will extend and cause the shroud access opening to move out of alignment with the feed container access opening to thereby deny access to the feed container. The extension on the extendable means is preferably tension adjustable such that an undesired species or marauder can be excluded from gaining access to the feed container. There is also disclosed a baffle which extends inwardly of the access opening to prevent the seed falling outwardly, the baffle being formed integrally with the side wall by material removed from the side wall to form the access opening.

23 Claims, 15 Drawing Sheets

BIRD FEEDER

This application claims benefit to U.S. Provisional Application Ser. No. 60/119,444, filed Feb. 10, 1999, which claims benefit to U.S. Provisional Application Ser. No. 60/150,940, filed Aug. 16, 1999.

The present invention relates to bird feeders, and more particularly relates to improvements therein.

BACKGROUND OF THE INVENTION

Selective bird feeders are well known in the art and are designed to limit the maximum size of a bird or animal which can access the seed in the feeder. The reasons for excluding certain birds may be many. Thus, as disclosed in U.S. Pat. No. 3,241,525, there is provided a selective bird feeder which is specific to cardinals. As taught by this patent, a favorite seed of cardinals is the sunflower seed; this seed is also popular with both smaller and larger birds.

Some larger birds will also access the seed and many such birds including crows, grackles, bluejays and the like are considered by some people to be undesirable.

A further problem associated with bird feeders is marauders which gain access to the seeds. In particular, squirrels are well known for their ability to reach the seed in a bird feeder and to devour the same. Many approaches have been tried to discourage or prevent squirrels from reaching the bird feeder, including various types of covers and baffles on poles. These seldom work as the squirrels have shown great ingenuity in overcoming such devices.

Some of the attempted solutions to the problem are disclosed in the prior art such as exemplified by U.S. Pat. No. 4,646,686 to Furlani which teaches a movable shroud. U.S. Pat. No. 3,145,690 to Bachman describes a bird feeder in which an inverted cylindrical hopper is suspended over a feeding pan; a bird perch surrounds the pan and is attached to a conical shroud. Both the perch and the shroud are supported by a compression spring whereby heavier birds or mammals on the perch cause the shroud to move downwardly.

Another shroud arrangement is shown in U.S. Pat. No. 3,126,870 wherein a cylindrical shroud surrounds a hopper and is mounted for rotation about a vertical axis under the bias of a weight.

While all of the above references disclose shroud type arrangements, such devices have not appeared to have received commercial acceptance in the marketplace. It might be surmised that this is due to the fact that some of the arrangements are relatively complicated and/or expensive to produce.

SUMMARY OF THE INVENTION

It is an object of the present invention to provide an adjustably selective bird feeder having a moveable shroud to protect and isolate the access openings by which the birds can gain access to the feed in the container from unwanted intruders.

It is a further object of the present invention to provide an adjustably selective bird feeder which uses an extendible member such as a spring to cause the shroud to move and protect the access openings when a predetermined weight is placed thereon.

It is a further object of the present invention to provide a feed container for a bird feeder which is easy to manufacture and uses a minimum of components.

According to one aspect of the present invention, there is provided a bird feeder which comprises a feed container having a base and an outer wall extending upwardly therefrom, at least one feed container access opening in the outer wall, a shroud extending about the feed container, at least one shroud access opening substantially aligned with the feed container access opening to thereby permit access to the feed container, hanging means connected to the feed container to permit hanging of the bird feeder, and extendible means within the feed container interconnecting the shroud and the feed container such that when a predetermined weight is placed on the shroud, the extendible means will extend and cause the shroud access opening to move out of alignment with the feed container access opening to thereby deny access to the feed container.

In a further aspect of the present invention, in a bird feeder having a feed container with a base, a side wall extending upwardly from the base and at least one access opening in the side wall to permit a bird to have access to an interior of the container, there is the improvement comprising a baffle extending inwardly of the access opening to prevent seed falling outwardly through the access opening, the baffle being formed integrally with the side wall by material removed from the side wall to form the access opening.

The bird feeder of the present invention provides an arrangement wherein the feed container is encapsulated or surrounded and completely protected by a system of interconnecting members. In a preferred embodiment, there is provided a top ring extending about an upper portion of the shroud, and a bottom ring extending about a bottom portion of the shroud, and a cover member removably secured to the upper end of the shroud. The cover, top ring, bottom ring, and shroud prevent access to any portion of the feed container at any point in time—i.e. whether the shroud is in its normal upward position or in its downward position.

BRIEF DESCRIPTION OF THE DRAWINGS

Having thus generally described the invention, reference will be made to the accompanying drawings illustrating embodiments thereof, in which.

DESCRIPTION OF THE PREFERRED EMBODIMENTS

Figure 1:
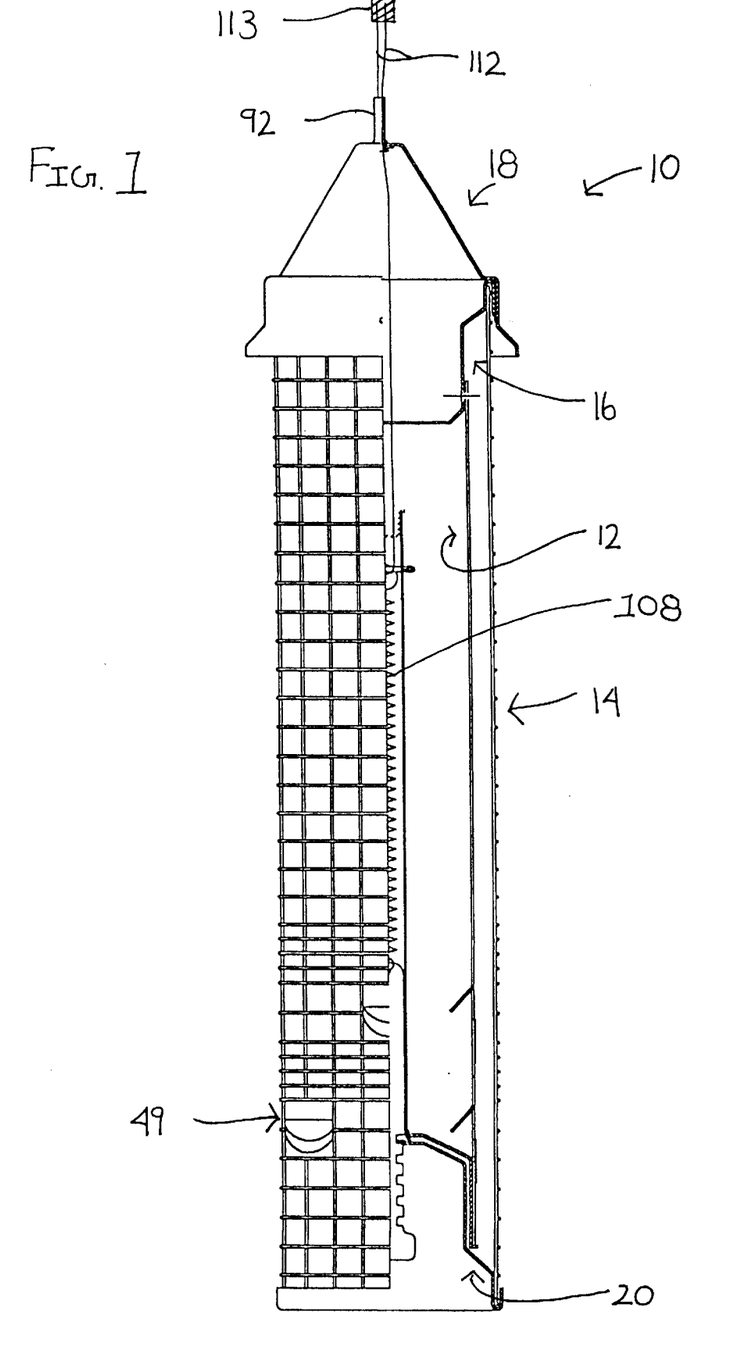
FIG. 1 is a side elevational view, partially in cutaway, of a bird feeder according to one embodiment of the present invention.

Referring to the drawings in greater detail and by reference characters thereto, there is illustrated in FIG. 1 a bird feeder according to one embodiment of the present invention and which bird feeder is generally designated by reference numeral 10.

Bird feeder 10 includes a feed container 12, a shroud 14, a top ring 16, a cover 18 and a bottom ring 20.

Feed container 12 includes, as may be best seen in FIGS. 3 and 4, a base generally designated by reference numeral 24 and which base 24 has a bottom wall 26 which is of a generally outwardly sloping nature for reasons which will become apparent hereinbelow. Bottom wall 26 merges with a vertical side wall 28 which terminates in an outwardly extending horizontal flange 30.

Secured to base 24 and in particular to bottom wall 26 thereof, is an upwardly extending center tube generally designated by reference numeral 32 and which is secured to bottom wall 26 by means of a rolled portion 34 and an outwardly extending flange 36 to thereby secure bottom wall 26 therebetween.

Feed container 12 also includes a side wall 38 of a cylindrical form extending upwardly from base 24. As may be seen, side wall 38 rests on flange 30 and is secured to side wall 28 by any suitable means such as dimpling. Drainage apertures 29 are provided within side wall 38 where it meets base 24.

Figure 9:
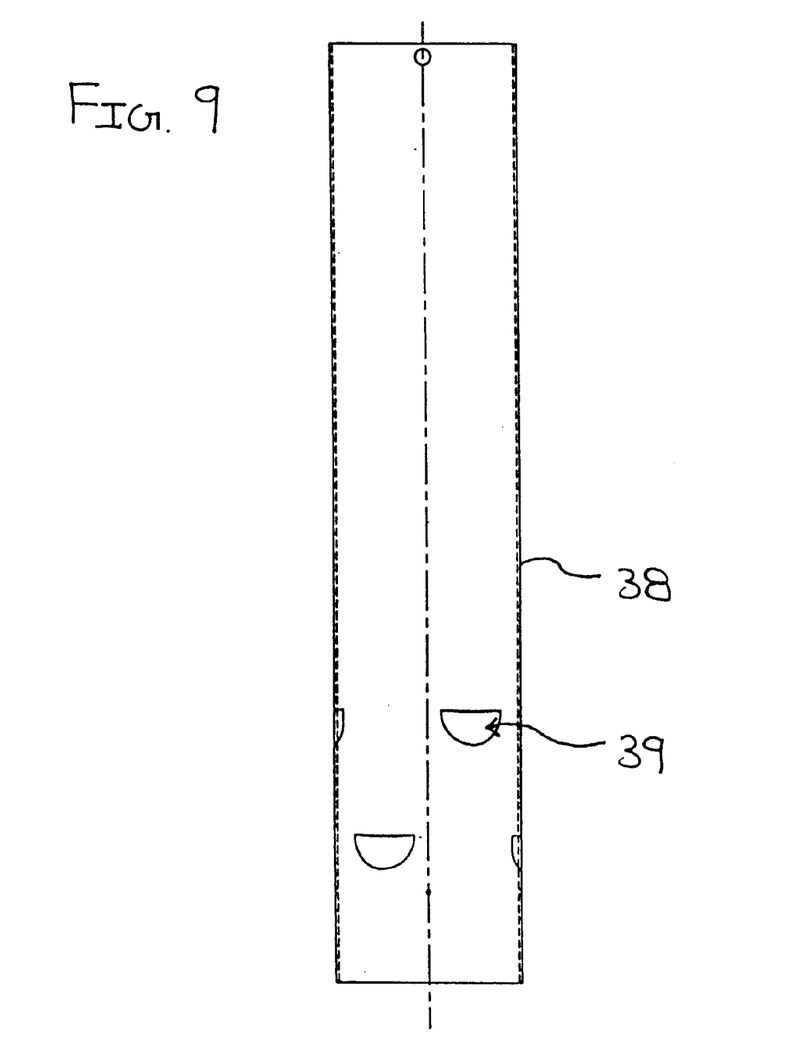
FIG. 9 is a side elevational view of the feed container.
Figure 10:
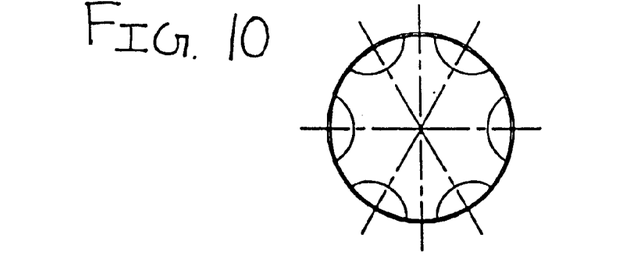
FIG. 10 is a top plan view of the feed container.
Figure 11:
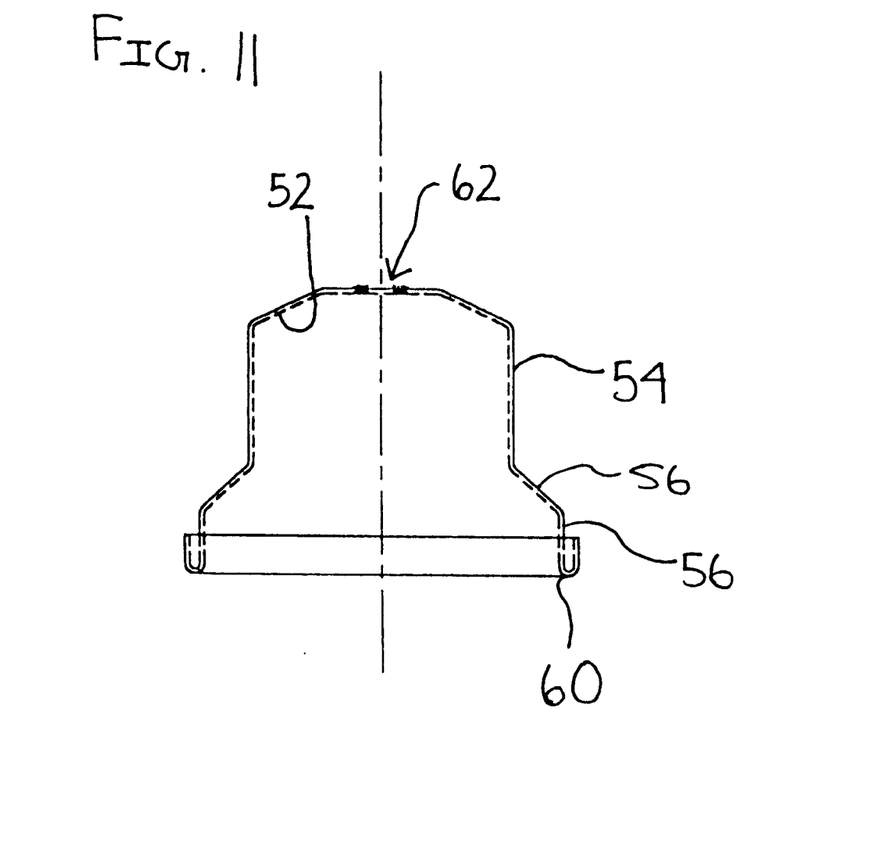
FIG. 11 is a side elevational view of a bottom ring component of the bird feeder of the embodiment of FIG. 1.
Figure 12:
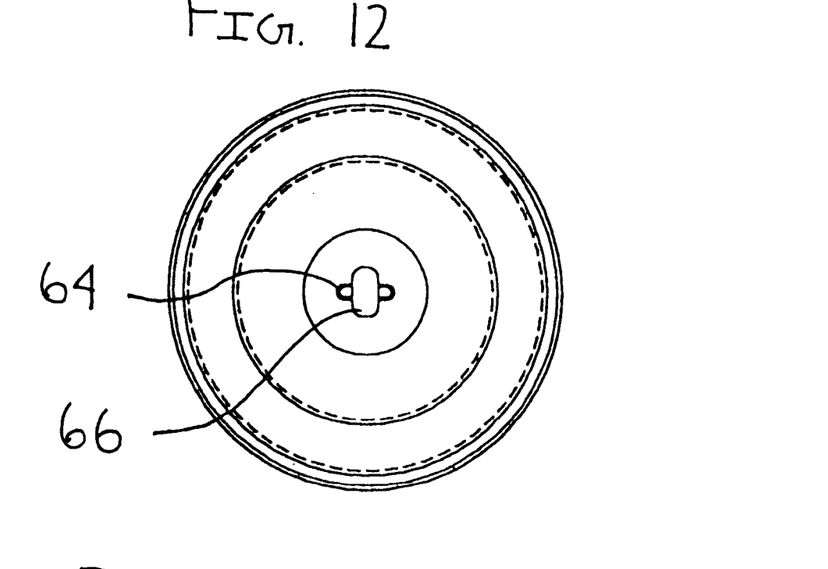
FIG. 12 is a top plan view thereof.

Side wall 38 has a plurality of access openings 39 formed therein and which access openings 39 have a baffle 40 to prevent seed from spilling out of access openings 39. Preferably, side wall 38 is formed of a material such as a polycarbonate material and baffles 40 are formed by cutting a bottom portion within side wall 38 and pushing baffles 40 inwardly about a hinge point 42. Thus, the material removed to provide access openings 39 remains to form baffles 40.

Figure 6:
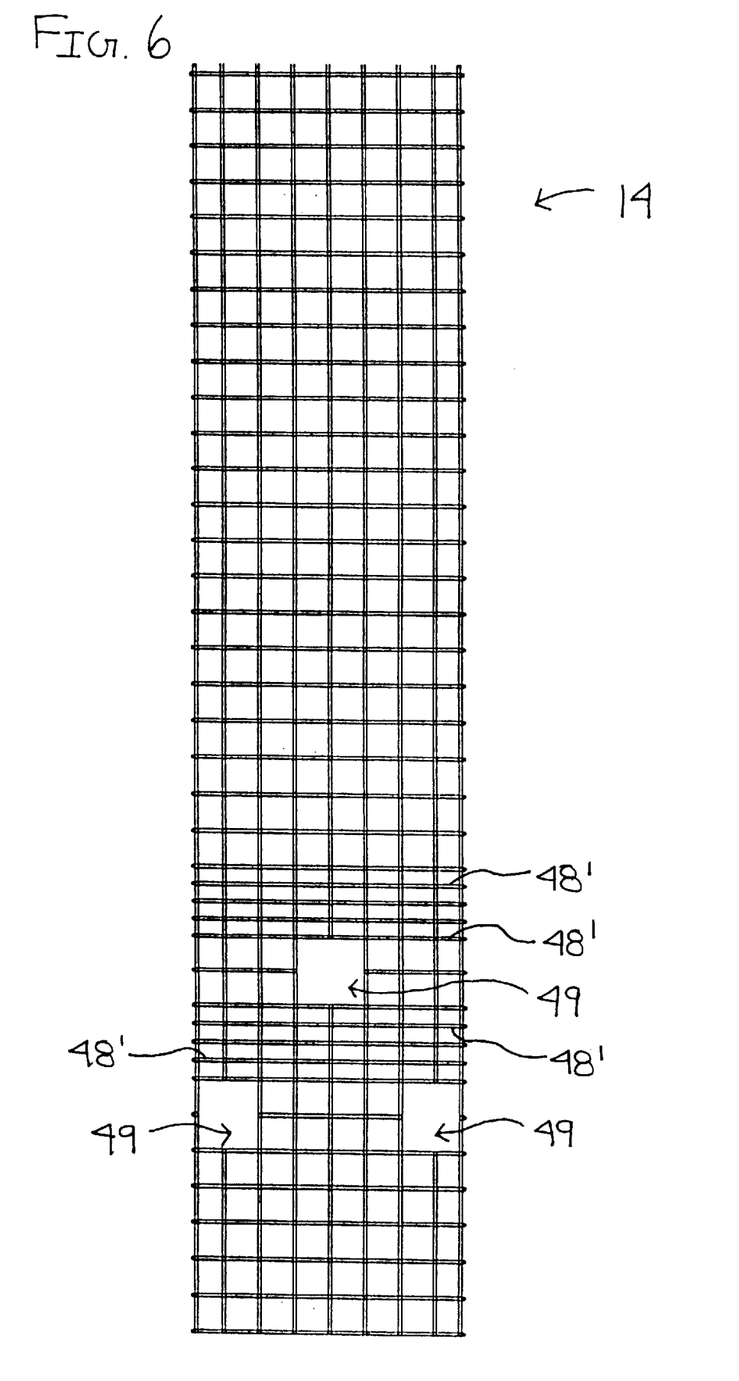
FIG. 6 is a side elevational view of the shroud used in the embodiment of FIG. 1.

Shroud 14, as best seen in FIG. 6, is formed of a mesh preferably of a suitable metallic material of a non corrosive nature and includes a plurality of vertical wires 46 and horizontal wires 48. Formed in shroud 14 are a plurality of access openings 49. As may be seen in FIG. 6, immediately above access openings 49, there are provided a plurality of supplementary horizontal wires 48' for reasons which will be discussed hereinbelow.

Bottom ring 20 is of an overall bell shaped configuration and as may be best seen in FIGS. 3, 4, 11 and 12, has a top wall 52 which is of an overall outwardly sloping configuration corresponding to that of bottom wall 26 of base 24. Top wall 52 merges with an upper side wall 54 having a generally vertical orientation which in turn terminates in an outwardly tapering portion 56. Outwardly tapering portion 56 merges with a lower vertical side wall portion 58 which then terminates in a bottom U-shaped portion 60.

Located centrally of top wall 52 is a slot 66 (FIG. 12) while there is provided an indented recess 64 of an elongated nature extending substantially perpendicularly to slot 66.

Figure 5:
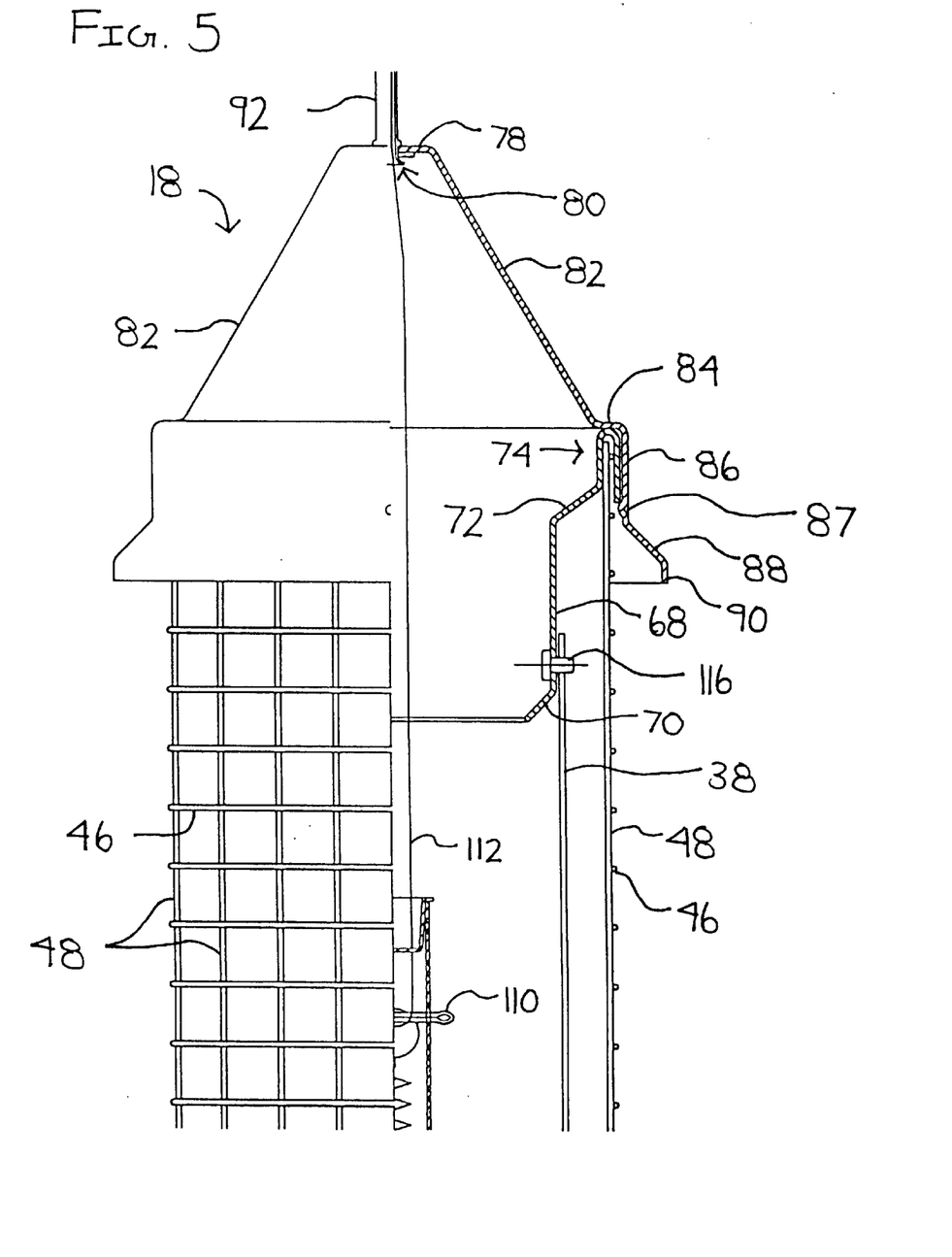
FIG. 5 is an enlarged view, partially in cutaway, of the upper portion of the bird feeder of FIG. 1.
Figure 7:
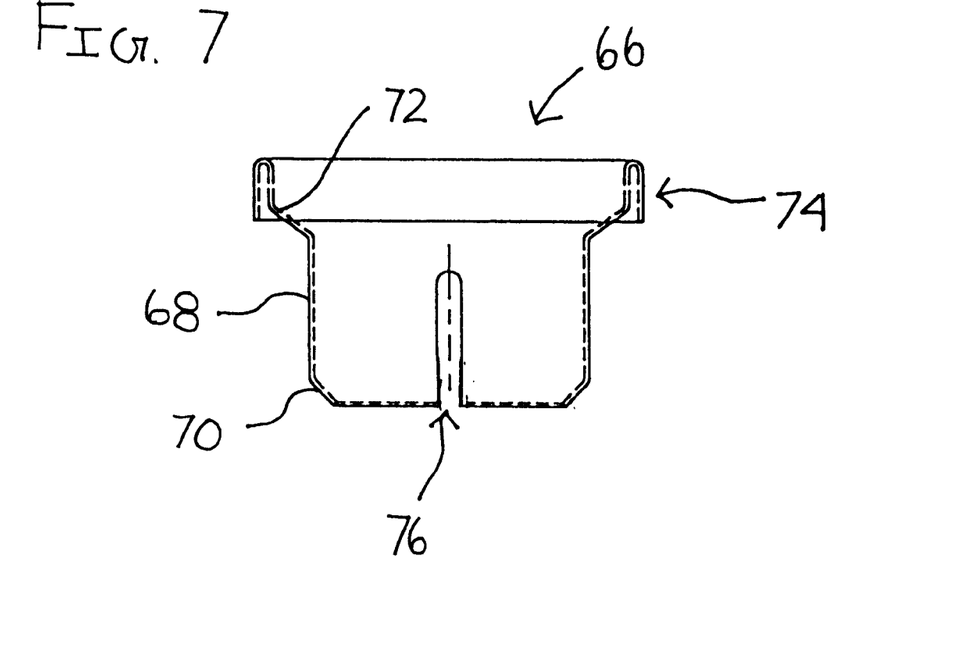
FIG. 7 is a side sectional view of a top ring component of the bird feeder of the embodiment of FIG. 1.
Figure 8:
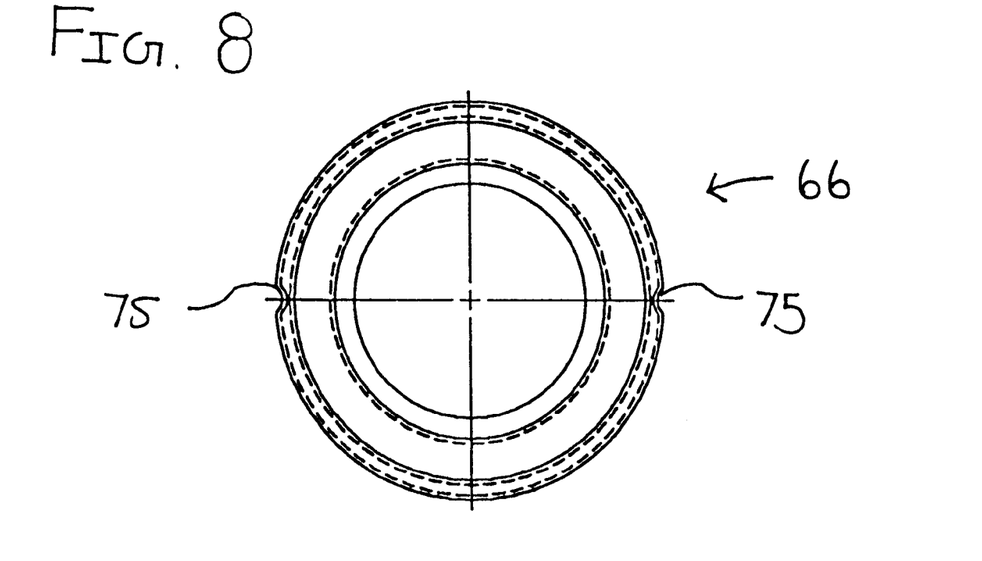
FIG. 8 is a top plan view thereof.

Top ring 16 is best seen in FIGS. 5, 7 and 8 and reference will now be made thereto. Top ring 16 is cup shaped and includes a lower vertical side wall 68 which, at its lower edge, terminates in an inwardly directing funnel wall 70. At its upper extremity, lower vertical side wall 68 merges with an outwardly tapering wall portion 72 which in turn merges with an inverted U-shaped portion 74. As shown in FIG. 7, there is provided a slot 76 which is formed in lower vertical side wall 68. Also, as seen in FIG. 8, there are provided a pair of vertical channels 75 which are formed in the outer wall of U-shaped portion 74.

Figures 2, 2A:
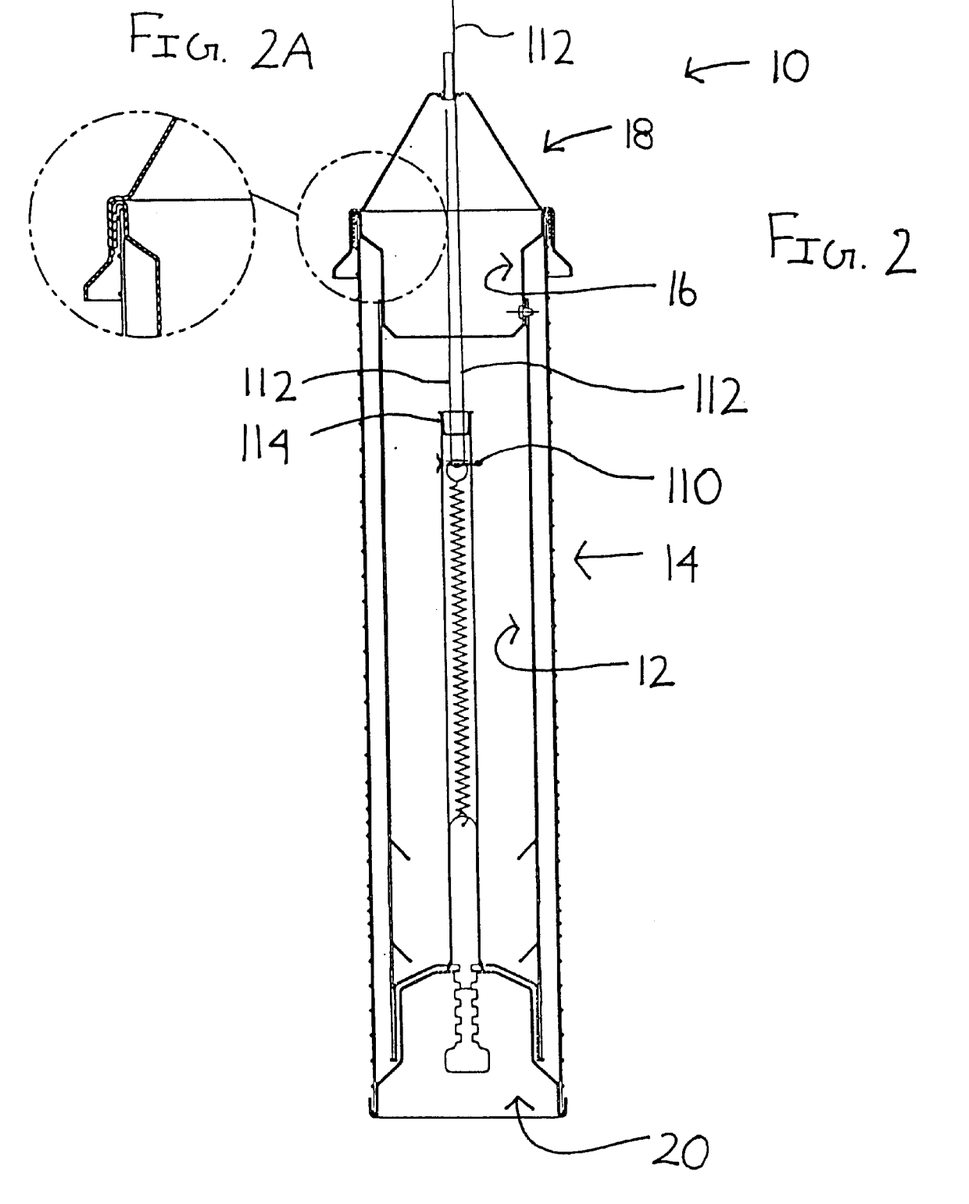
FIG. 2 is a side sectional view thereof.
FIG. 2A is an enlarged view of the interconnection of the cover, top ring and shroud as identified by the dashed lines in FIG. 2.

Cover 18, as shown in FIGS. 2 and 5, includes a top wall 78 having a centrally located aperture 80 formed therein. Top wall 78 merges with an outwardly sloping wall 82 which, at its lower peripheral edge, merges with a horizontal wall portion 84. Extending downwardly from horizontal wall portion 84 is a lower vertical side wall portion 86. A pair of dimples 87 (only one shown) are formed in lower vertical side wall portion 86 as seen in FIG. 5. Lower vertical side wall portion 86 terminates in an outwardly extending wall 88 and which is provided with a drip edge 90.

Secured to top wall 78 and extending upwardly therefrom is a conduit generally designated by reference numeral 92.

Bird feeder 10 includes a locking member 96 (FIGS. 2 and 3) and which locking member 96 has an upper body portion 98 and a lower body portion 100. Formed in lower body portion 100 are a plurality of recesses 102 to thereby provide outwardly extending tabs 103. At the bottom of lower body portion 100 there is provided a gripping handle 104. Located proximate to the upper marginal edge of upper body portion 98 is an aperture 106. Aperture 106 is designed to receive a spring 108 mounted interiorly of center tube 32. Proximate the upper extremity of center tube 32, there is provided a locking pin 110 which extends through the walls of center tube 32. Locking pin 110 serves as an attachment point for the upper end of spring 108 as shown in FIG. 2.

Locking pin 110 also serves as an anchor point for a cable 112 which is looped thereabout and which cable 112 extends upwardly through conduit 92. As seen in FIG. 2, there is provided a cup member 114 which fits within the upper recess of center tube 32 and which allows drainage of water from cable 112 therethrough. A stopper 113 (FIG. 1) prevents cover 18 from falling off when feed container 112 is being filled.

As is shown in FIG. 5, there is also provided a guide pin 116 which is secured to an upper portion of side wall 38 of feed container 12.

Figure 3:
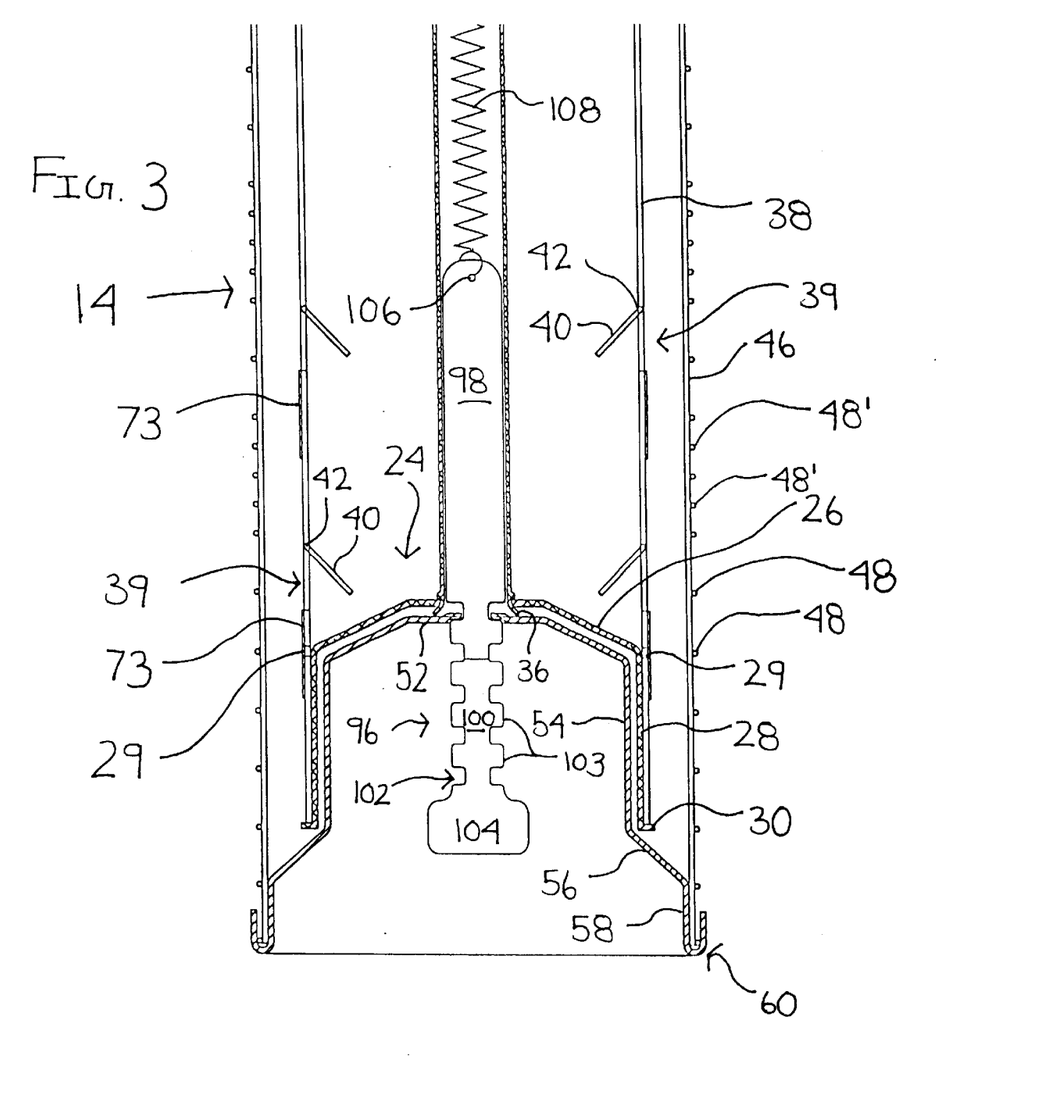
FIG. 3 is an enlarged cross sectional view illustrating the bottom portion of the bird feeder.
Figure 4:
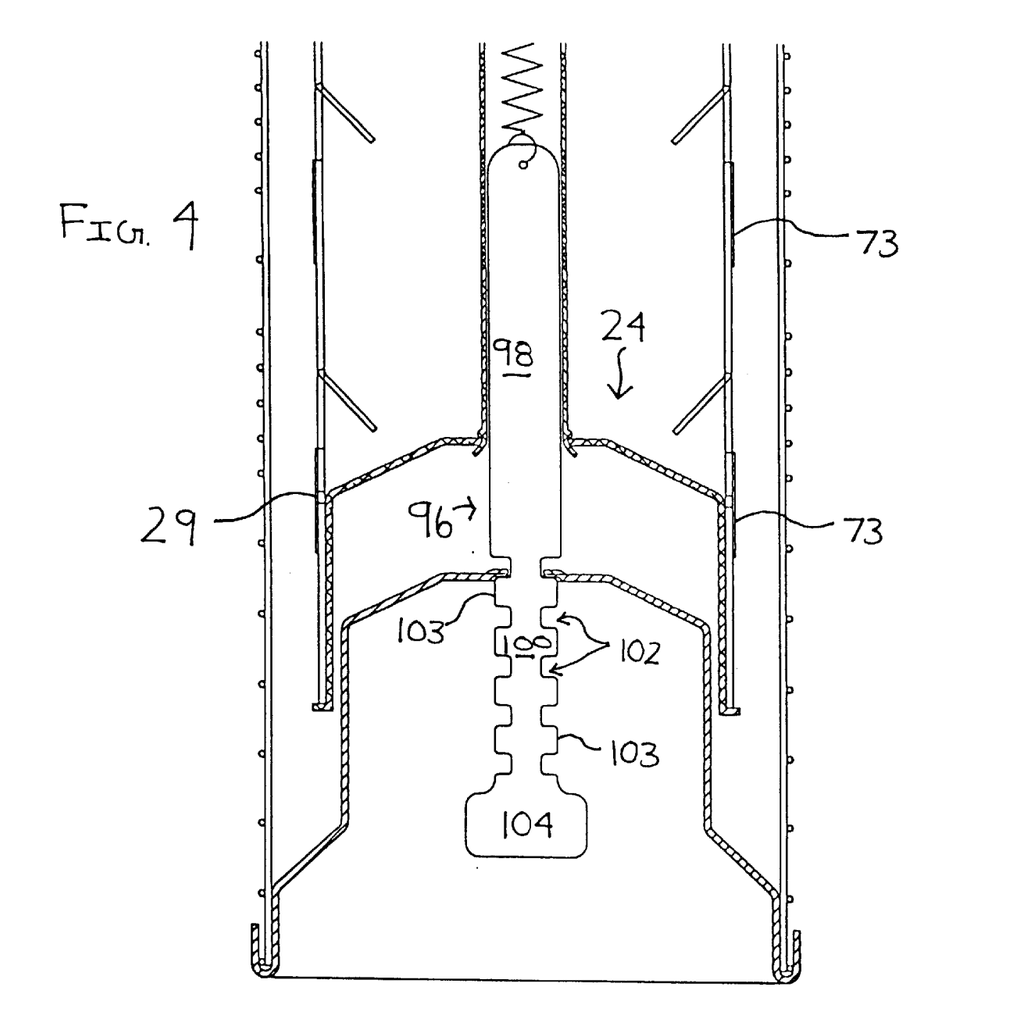
FIG. 4 is a view similar to that of FIG. 3 illustrating the shroud in a closed position about the access openings.

As best seen in FIG. 3, shroud 14 is designed to fit within U-shaped portion 60 of bottom ring 20 and inverted U-shaped portion 74 of top ring 16 (FIG. 5). In its normal operational position, flange 30 of base 24 will seat on outwardly tapering wall portion 56 of bottom ring 20. In this normal operational position, access openings 49 of shroud 14 are in alignment with access openings 39 formed in side wall 38 of feed container 12. In this position, guide pin 116 (FIG. 5) at the upper edge of side wall 38 fits within slot 76 (FIG. 7) of lower vertical side wall portion 68 of top ring 16 and would be positioned at the lower end of slot 76 and maintains rotational alignment of the opening in shroud 14 and feed container 12.

Cover 18 (FIG. 5) is placed in position by aligning dimples 87 with channels 75 (FIG. 8) formed in the outer wall of inverted U-shaped portion 74. Once placed in position, and mounted thereon, cover 18 may be rotated such that dimples 87 will engage the bottom peripheral edge of the outer side wall of inverted U-shaped portion 74 thereby permitting the same to be retained in position. Prior to doing so, access is provided to the interior of feed container 12 by removal of the cover and feed may be easily poured therein with funnel wall 70 acting as a guide.

As aforementioned, in its normal operational position, access openings 49 in shroud 14 are in alignment with access openings 39 of side wall 38. However, should any marauders such as a squirrel attempt to gain access to the feed container, the weight of the marauder on any portion of cover 18, shroud 14 or conduit 92 will cause spring 108 to extend and to thereby cause shroud 14 to move downwardly to deny access to access openings 39. The relatively long length of spring 108 permits one to easily adjust the tension. As shown in FIG. 4 illustrating the shroud in a downward position, supplementary horizontal wires 48' along with normal horizontal wires 48 prevent access to the feed container. Also, shields 73 may be provided on side wall 38 to prevent a marauder from chewing thereon when the shroud has moved downwardly.

The arrangement is such that the marauder can not gain access even by such means as attempting to hold on at the top of the feeder. Any weight on conduit 92 and/or cover 18 and/or shroud 14 is immediately transmitted to spring 108 causing extension thereof. The feed container is designed such that the distance between access openings 39 and the upper portion of conduit 92 will not permit the marauder access thereto—i.e. conduit 92 extends upwardly a sufficient distance to prevent an animal hanging from cable 112 to gain access. Conduit 92 also acts as a shield for cable 112 which prevents the animal from gaining a secure hold on the cable.

The bird feeder 10 permits the adjustment of the weight required to cause the descent of the shroud 14 to be varied. Thus, as shown in FIG. 3, a user may grasp gripping handle 104 and rotate locking member 96 through 90 degrees so as to bring tabs 103 in alignment with bottom slot 62 (FIG. 11) in top wall 52 of bottom ring 20. When the desired position is reached, locking member 96 will again be rotated through 90 degrees so as to retain tabs 103 in a desired position on bottom recess 64. Thus, the degree of extension of spring 108 can be varied and thereby the force required to cause the shroud 14 to move downwardly can also be varied—as aforementioned, the attachment of the spring near the top of the container is important.

A further embodiment of the invention is illustrated in FIGS. 13 to 18 and reference will now be made thereto.

Figure 13:
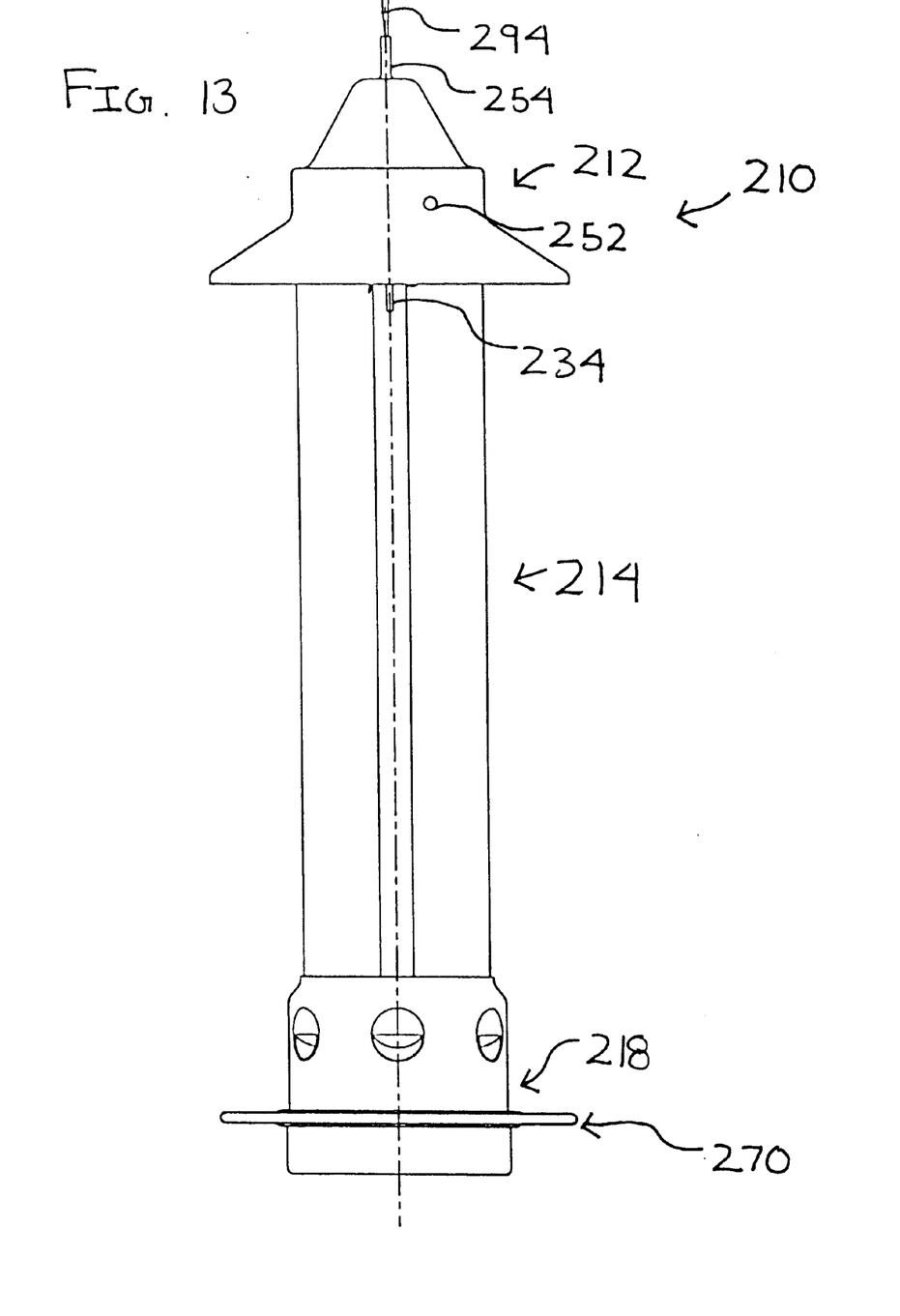
FIG. 13 is a side elevational view of a further embodiment of a bird feeder according to the present invention.
Figure 14:
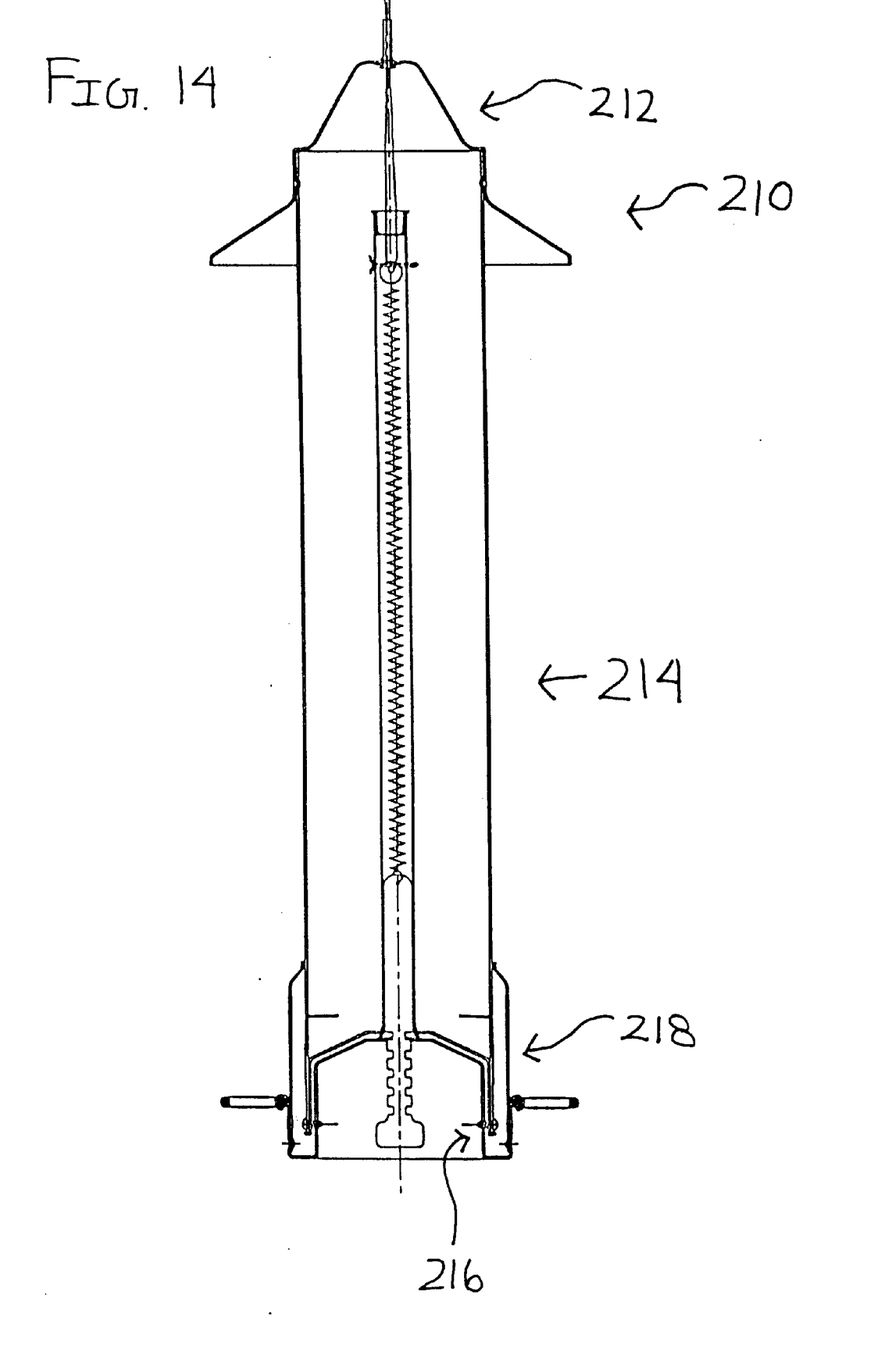
FIG. 14 is a side sectional view of the embodiment shown in FIG. 13.

As shown in FIGS. 13 and 14, there is provided a bird feeder which is generally designated by reference numeral 210 and which includes a cover 212, a feed container 214, a bottom ring 216 and a shroud 218. As many of the components are similar in nature to the first described embodiment, some of the details will be omitted and reference may be had to the first embodiment.

Feed container 214 includes a base generally designated by reference numeral 220 (FIG. 16) and which base 220 has a top wall 222, a vertically extending side wall 224 and an outwardly extending flange 226 on which is mounted the feed container.

Figure 17:
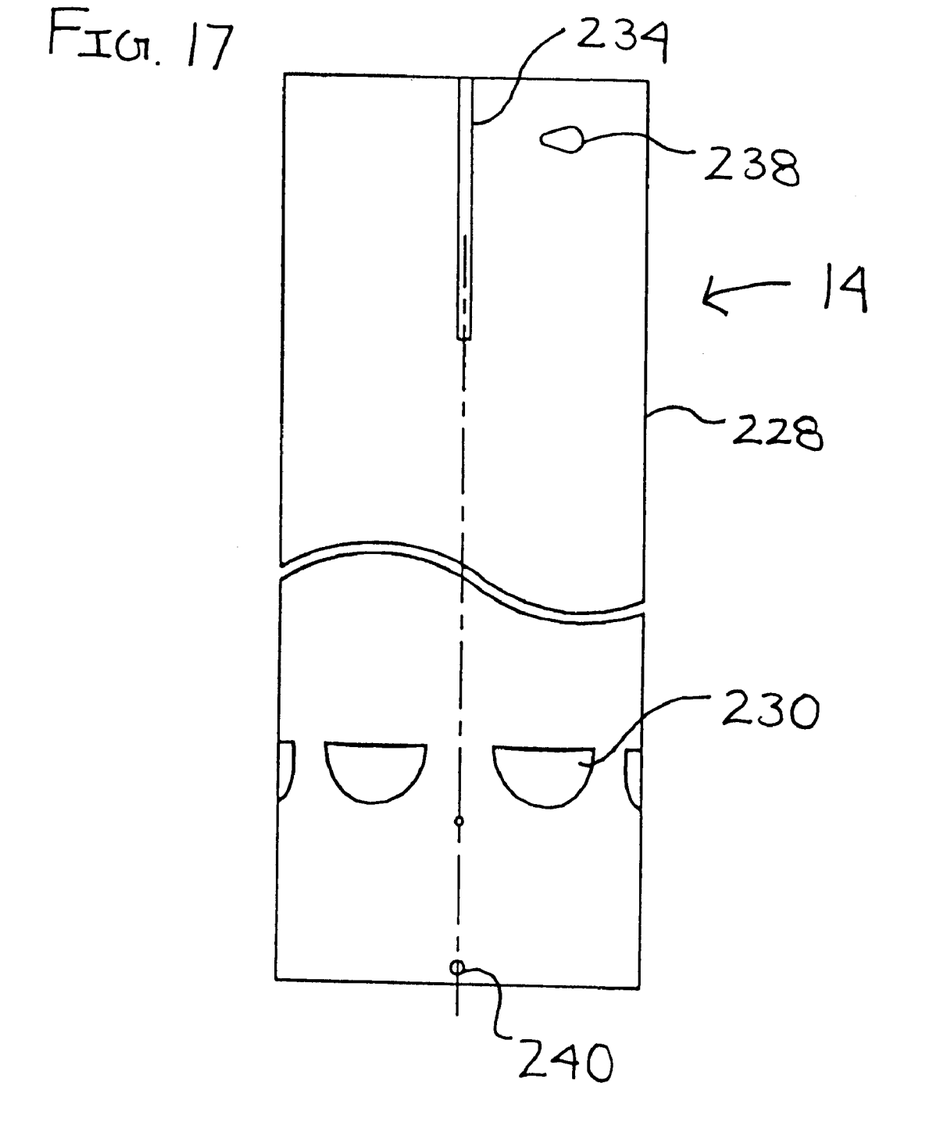
FIG. 17 is a side elevational view of the feed container of the embodiment of FIG. 13.
Figure 18:
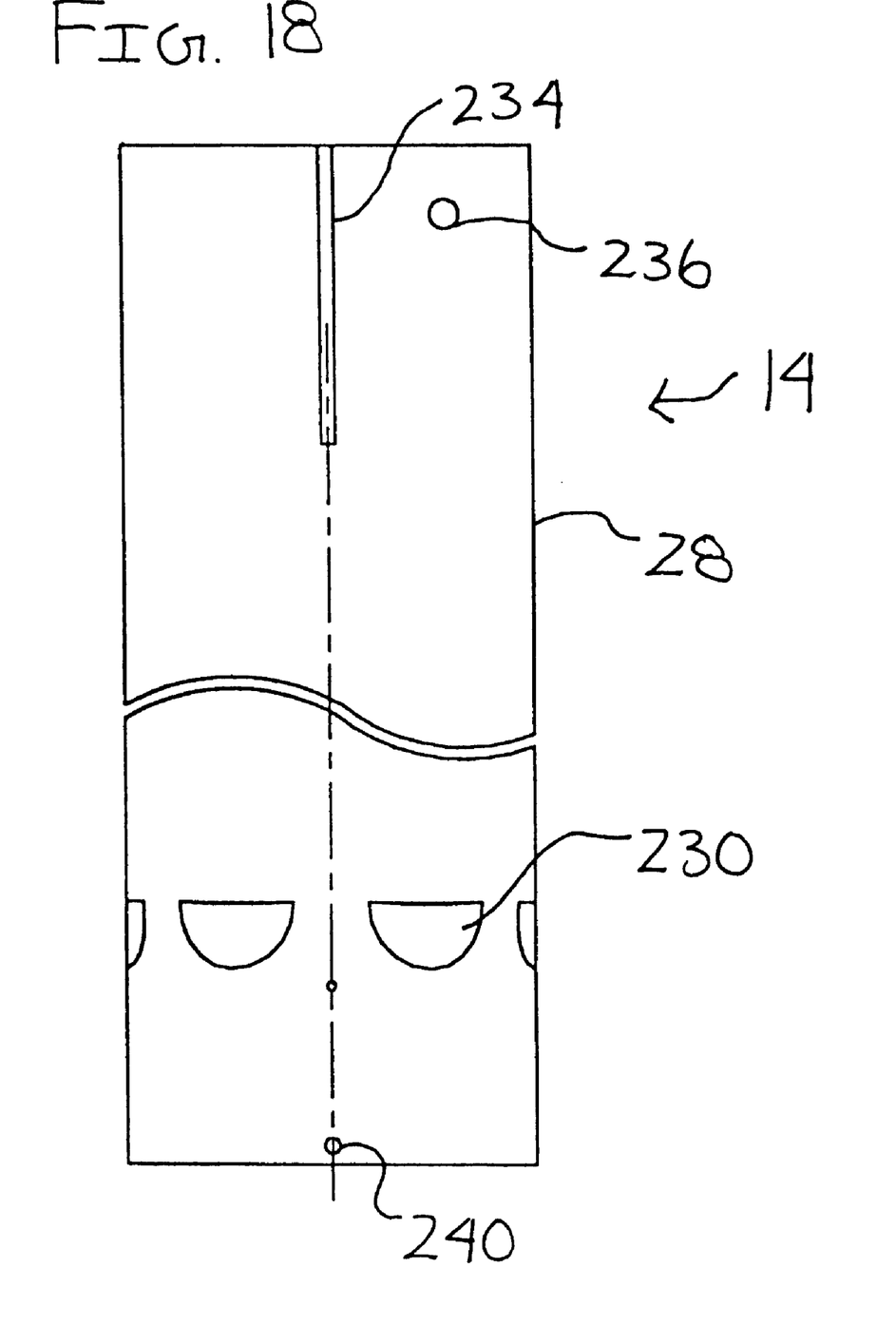
FIG. 18 is a side elevational view of a modified version of the feed container of FIG. 17.

Feed container 214 also has a side wall 228 preferably of a transparent plastic material such as a polycarbonate. Access openings 230 are provided therein and baffles 232 are formed as previously described.

At its upper edge, side wall 228 (FIG. 17) is provided with a pair of slots 234 (only one shown). Located proximate slots 234 are, in the embodiment of FIG. 18, a circular aperture 236 or, in the embodiment of FIG. 17, a tear shaped aperture 238.

Cover 212 has a top wall 242, an upper sloping wall 244, a vertical side wall 246 and a lower sloping wall 248 which terminates in a drip edge 250. As may be seen in FIGS. 13 and 15, dimples 252 are provided in vertical side wall 246. Dimples 252 are designed to slidingly fit within slots 234. In this respect, the formation of slots 234 in a material such as a polycarbonate has been found to cause the tubular feed container to somewhat distort from a true circular outline to a somewhat oval outline. The slots 234 impart a greater flexibility of the material adjacent thereto; this permits the rotation of cover 212 whereby dimples 252 will then seat in recess 236 or 238 and tend to restore the cover to its circular configuration due to the memory of the plastic. This arrangement eliminates the use of an upper ring to secure the cover to the feed tube as was used in the previously described embodiment.

Figure 15:
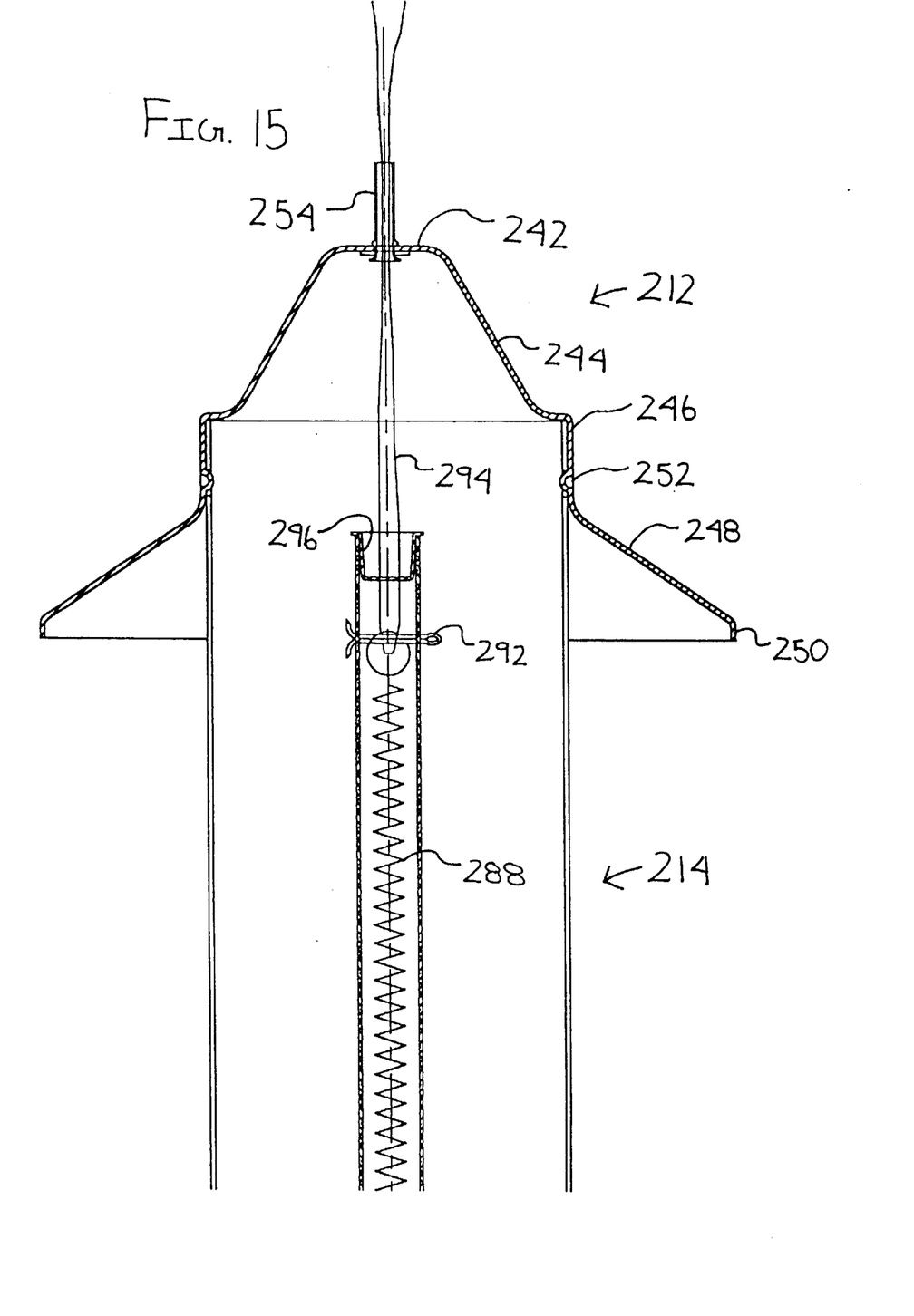
FIG. 15 is a sectional view showing the upper portion of the bird feeder of the embodiment of FIG. 13.

As was the case in the previously described embodiment, a conduit 254 may be secured to top wall 242 of cover 212.

Figure 16:
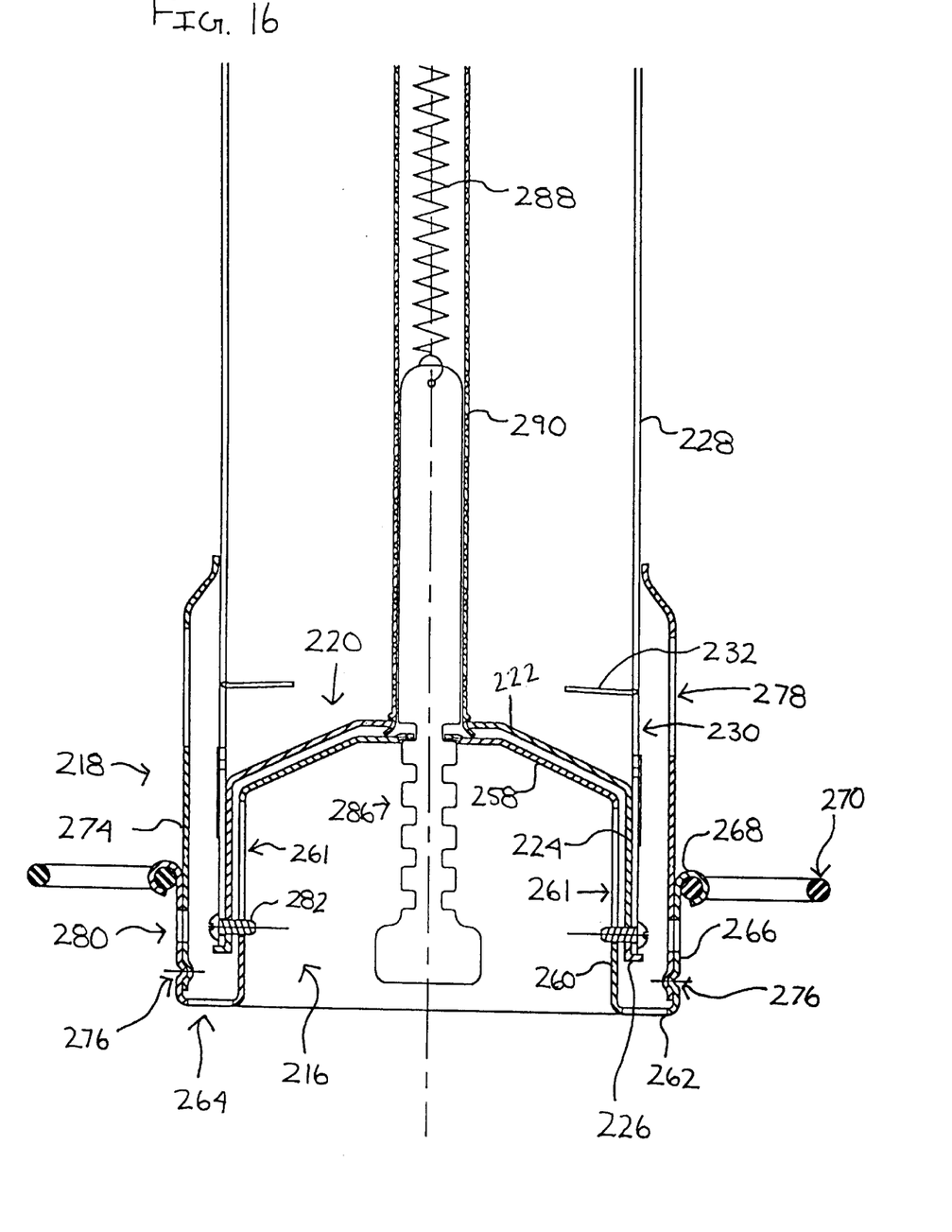
FIG. 16 is an enlarged cross sectional view of the bottom portion thereof.

Bottom ring 216 includes an upper wall 258 which merges with an inner cylindrical side wall 260 and which in turn merges with a bottom wall 262. A plurality of bottom wall apertures 264 are provided therein for drainage purposes. An outer side wall 266 extends upwardly from bottom wall 262 and terminates in a mounting portion generally designated by reference numeral 268. Mounting portion 268 is designed to receive a perch member 270 to permit the birds to sit thereon.

Shroud 218 includes a cylindrical side wall 274 which is secured to outer side wall 262 of bottom ring 216 by means of dimples 276. A plurality of access openings generally designated by reference numeral 278 are provided in side wall 274 of shroud 218 and which access openings are aligned with access openings 230 in side wall 228 of feed container 214. Also provided in side wall 274 are lower apertures 280 which permit access to screws 282 used to secure feed container 214 to side wall 224 of base 220. Screws 282 will also act as guide members fitting within a slot 261 formed in inner side wall 260 of bottom ring 216.

As was the case in the previously described embodiment, there is provided a locking member 286 which permits the selective adjustment of the tension on a spring 288 mounted within center tube 290. Similarly, there is provided an upper locking pin 292 to receive the upper end of spring 288 and cable 294. A cup member 296 is provided to fit within the upper portion of center tube 290 and which permits drainage of any liquid within the center tube.

It will be understood that the above described embodiments are for purposes of illustration only and that changes and modifications may be made thereto without departing from the spirit and scope of the invention.

I claim:

1. A bird feeder comprising:

a feed container having a base and an outer wall extending upwardly therefrom, at least one feed container access opening in said outer wall;

a shroud extending about at least a portion of said feed container, at least one shroud access opening substantially aligned with said feed container access opening to thereby permit access to said feed container;

a hollow center tube within said feed container;

hanging means comprising a cable connected to said hollow inner tube to permit hanging of said bird feeder;

spring means within said hollow center tube interconnecting said shroud and said feed container such that when a predetermined weight is placed on said shroud, said spring means will permit said shroud and said shroud access opening to move out of alignment with said feed container access opening to thereby deny access to said feed container and subsequently cause said shroud and said shroud access opening to return to alignment with said feed container access opening when said predetermined weight is removed.

2. The bird feeder of claim 1 further including a top ring located at a top end of said shroud, a bottom ring located at a bottom end of said shroud and secured thereto, each of said top ring and bottom ring having a cylindrical portion designed to function as a guide and bearing surface during coaxial movement of said shroud and said feed container.

3. The bird feeder of claim 2 wherein said top ring and said bottom ring encapsulate said feed container while permitting access through said top ring to said feed container.

4. The bird feeder of claim 3 further including cover means removably attached to said top ring, the arrangement being such that when said cover is attached, said feed container is completely encapsulated to thereby completely deny access to any portion of said feed container by a marauder.

5. The bird feeder of claim 4 wherein said cover means is attached to said top ring by means of a dimple on said cover engaging a side wall of said top ring.

6. The bird feeder of claim 2 further including a guide and alignment member secured to said upper end of said outer wall of said feed container, said guide and alignment means cooperating with said top ring to maintain said feed container and said shroud in alignment and prevent relative rotation therebetween.

7. The bird feeder of claim 6 wherein said guide and alignment means comprises a pin and slot arrangement.

8. The bird feeder of claim 2 wherein said shroud is formed of a wire mesh.

9. The bird feeder of claim 8 further comprising reinforced areas on said shroud adjacent said shroud access openings.

10. The bird feeder of claim 9 further including reinforced portions on said outer wall of said feed container, said reinforced portions being below said feed container access opening.

11. The bird feeder of claim 2 wherein said bottom ring has a downwardly and outwardly extending surface to permit drainage therefrom.

12. The bird feeder of claim 2 wherein each of said top ring and said bottom ring functions as a stop member to limit travel movements of said shroud.

13. The bird feeder of claim 1 wherein said feed container and said shroud are cylindrical.

14. The bird feeder of claim 1 wherein said feed container access opening includes a baffle extending inwardly of said access opening to prevent seed falling outwardly through said access opening, said baffle being formed integrally with said side wall by material removed from said side wall to form said access opening.

15. The bird feeder of claim 1 further including drainage apertures located at a bottom portion of said outer wall.

16. The bird feeder of claim 1 wherein said hollow center tube extends upwardly from said base of said feed container, said spring means comprising a coil spring mounted within said hollow tube.

17. The bird feeder of claim 16 wherein said coil spring has a first end thereof attached to an upper end of said hollow center tube and a second end thereof attached to said bottom ring.

18. The bird feeder of claim 16 wherein said hanging means comprises a cable.

19. The bird feeder of claim 18 wherein said cable extends through said cover and is secured to said hollow tube.

20. The bird feeder of claim 19 further comprising means for adjusting tension on said spring to thereby adjust the predetermined weight which will cause said spring to extend and said shroud access openings to move out of alignment with said feed container access openings.

21. The bird feeder of claim 20 wherein said means to adjust said spring tension comprises a key member attached to said second end of said spring, said key member being designed to be secured to said bottom ring at different locations.

22. The bird feeder of claim 19 further including a conduit extending upwardly from said cover and being secured thereto, said cable extending through said conduit.

23. The bird feeder of claim 19 further including stopper means on said cable to prevent complete removal of said cover.

* * * * *